United States Patent [19]
Rodgers et al.

[11] Patent Number: 5,272,220
[45] Date of Patent: Dec. 21, 1993

[54] PROCESS FOR PREPARING STYRENE-ISOPRENE-BUTADIENE RUBBER

[75] Inventors: Michael B. Rodgers, Akron; Stanley M. Mezynski, Mogadore; Adel F. Halasa, Bath; Wen-Liang Hsu, Copley; Barry A. Matrana, Akron; Joel L. Cox, North Canton, all of Ohio

[73] Assignee: The Goodyear Tire & Rubber Company, Akron, Ohio

[21] Appl. No.: 944,669

[22] Filed: Sep. 14, 1992

[51] Int. Cl.$^5$ .............................. C08F 2/06; C08F 8/42
[52] U.S. Cl. ............................. 525/332.3; 525/332.8; 525/342; 525/371; 525/53; 526/74; 526/180; 526/337
[58] Field of Search .................... 526/74, 180, 337; 525/53, 332.2, 332.3, 342, 371, 332.8

[56] References Cited

U.S. PATENT DOCUMENTS

| | | | |
|---|---|---|---|
| 4,311,803 | 1/1992 | Smith et al. | 526/180 X |
| 4,397,994 | 8/1983 | Takeuchi et al. | 525/332.3 |
| 4,603,722 | 8/1986 | Oshima et al. | 525/332.3 X |
| 4,843,120 | 6/1989 | Halasa et al. | 525/53 |
| 4,845,165 | 7/1989 | Halasa et al. | 526/78 |
| 5,047,483 | 9/1991 | Halasa et al. | 525/237 |
| 5,070,148 | 12/1991 | Hsu et al. | 525/316 |
| 5,137,998 | 8/1992 | Hsu et al. | 526/174 |

*Primary Examiner*—Fred Teskin
*Attorney, Agent, or Firm*—Alvin T. Rockhill

[57] ABSTRACT

The subject invention discloses a styrene-isoprene-butadiene rubber which is particularly valuable for use in making truck tire treads, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about $-90°$ C. to about $-70°$ C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

9 Claims, No Drawings

PROCESS FOR PREPARING STYRENE-ISOPRENE-BUTADIENE RUBBER

BACKGROUND OF THE INVENTION

Fuel expenses are one of the major costs encountered by the trucking industry. In recent years, many modifications have been implemented which make trucks more energy efficient. For instance, better fuel efficiency is being attained by implementing more aerodynamic designs which offer a lower coefficient of drag. Improved fuel efficiency can also be attained by designing tires which display less rolling resistance.

In order to reduce the rolling resistance of a tire, rubbers having a high rebound can be utilized in making the tires' treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about $-110°$ C. and $-20°$ C. and exhibit a second glass transition temperature which is within the range of about $-50°$ C. to $0°$ C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between $-110°$ C. and $-20°$ C. and subsequently continuing said polymerization in a second reaction zone at a temperature and under conditions sufficient to produce a second polymeric segment having a glass transition temperature which is between $-20°$ C. and $20°$ C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about $40°$ C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about $-10°$ C. to about $-40°$ C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

SUMMARY OF THE INVENTION

It has been unexpectedly found that the rolling resistance and tread wear characteristics of truck tires can be significantly improved by incorporating the styrene-isoprene-butadiene rubber (SIBR) of this invention into the treads thereof. More importantly, this improvement in rolling resistance and tread wear characteristics can be achieved without sacrificing wet traction and wet skid resistance. Truck tires made utilizing this specific SIBR in the treads thereof also display a resistance to stone cutting which is at least as good as that observed in conventional truck tires.

The subject invention more specifically discloses a styrene-isoprene-butadiene rubber which is particularly valuable for use in making truck tire treads, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about $-90°$ C. to about $-70°$ C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

The subject invention further discloses a pneumatic truck tire having an outer circumferential tread wherein said tread is a sulfur cured rubber composition comprised of, based on 100 parts by weight of rubber, (a) from about 45 to about 75 parts of a styrene-isoprene-butadiene rubber comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene, and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4,-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5; and (b) from about 25 to about 55 parts of natural rubber.

The subject invention also reveals a pneumatic truck tire having an outer circumferential tread wherein said tread is a sulfur cured rubber composition comprised of, based on 100 parts by weight of rubber, (a) from about 50 to about 70 parts of a styrene-isoprene-butadiene rubber comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene, and 1,3-butadiene are in essentially random order, wherein from about 25% to about 40% of the repeat units derived from the 1,3- butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5; and (b) from about 15 to about 45 parts of natural rubber; and (c) from about 2 to about 20 parts of high cis-1,4-polybutadiene.

The SIBR of this invention is prepared by solution polymerizations utilizing an organolithium initiator. The process used in synthesizing this SIBR is conducted as a continuous process which is carried out at a temperature which is within the range of about 75° C. to about 150° C. It has been unexpectedly found that gel build-up can be inhibited by conducting such polymerizations in the presence of 1,2-butadiene and N,N,N',N'-tetramethylethylenediamine.

This invention more specifically reveals a process for preparing a styrene-isoprene-butadiene rubber which is particularly valuable for use in making truck tire treads which comprises the steps of (1) continuously solution terpolymerizing in an organic solvent from about 5 weight percent to about 20 weight percent styrene, from about 7 weight percent to about 35 weight percent isoprene, and from about 55 weight percent to about 88 weight percent 1,3-butadiene, based on total monomers, to a conversion which is in the range of about 60% to 100% to produce a living intermediate polymer, wherein the terpolymerization is initiated with an organolithium compound, wherein the terpolymerization is conducted in the presence of 10 ppm to 500 ppm of 1,2-butadiene, and wherein the terpolymerization is conducted in the presence of N,N,N',N'-tetramethylethylenediamine at a molar ratio of N,N,N',N'-tetramethylethylenediamine to the organolithium compound which is within the range of about 0.01:1 to about 0.2:1, and wherein the terpolymerization is conducted at a temperature which is within the range of about 75° C. to about 150° C.; (2) partially coupling the living intermediate polymer with a coupling agent selected from the group consisting of divinyl benzene, tin tetrachloride and silicon tetrachloride, wherein the molar ratio of the organolithium compound to the coupling agent is within the range of about 6:1 to about 20:1; (3) allowing the terpolymerization to continue so as to produce the styrene-isoprene-butadiene rubber; and recovering the styrene-isoprene-butadiene rubber from the organic solvent.

DETAILED DESCRIPTION OF THE INVENTION

The SIBR of this invention is synthesized by solution polymerization. Such solution polymerizations will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer, styrene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 5 weight percent to about 20 weight percent styrene, from about 7 weight percent to about 35 weight percent isoprene and from about 55 weight percent to about 88 weight percent 1,3-butadiene monomer. It is typically preferred for the monomer charge composition to contain from about 6 weight percent to about 15 weight percent styrene, from about 10 weight percent to about 30 weight percent isoprene, and from about 60 weight percent to about 80 weight percent 1,3-butadiene. It is generally more preferred for the monomer charge composition to include from about 8 weight percent to about 12 weight percent styrene, from about 15 weight percent to about 30 weight percent isoprene, and from about 60 weight percent to about 75 weight percent 1,3-butadiene.

The SIBR of this invention is synthesized on a continuous basis. In this continuous process, the monomers and an organolithium initiator are continuously fed into a reaction vessel. The pressure in the reaction vessel is typically sufficient to maintain a substantially liquid phase under the conditions of the polymerization reaction. The reaction medium will generally be maintained at a temperature which is within the range of about 75° C. to about 150° C. throughout the terpolymerization. This is generally preferred for the terpolymerization to be conducted at a temperature which is within the range of about 80° C. to about 120° C. It is typically more preferred for the terpolymerization to be conducted at a temperature which is within the range of about 90° C. to about 100° C.

The organolithium compounds which can be utilized as initiators in the terpolymerizations of this invention include organomonolithium compounds and organomultifunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of organolithium initiator employed will be dependent upon the molecular weight which is desired for the SIBR being synthesized. An amount of organolithium initiator will be selected to result in the production of SIBR having a number average molecular weight which is within the range of about 150,000 to about 400,000 and a weight average molecular weight which is within the range of about 300,000 to about 800,000. The amount of organolithium initiator will preferably be selected to result in the production of a SIBR having a number average molecular weight which is within the range of about 250,000 to 300,000 and a weight average molecular weight which is within the range of about 500,000 to about 600,000.

As a general rule in all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of 1,2-butadiene and N,N,N',N'-tetramethylethylenediamine (TMEDA). For this reason 1,2-butadiene and TMEDA will also be continuously fed into the reaction vessel utilized. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm. The TMEDA will typically be present at a molar ratio of TMEDA to the organolithium compound which is within the range of about 0.01:1 to about 0.2:1. A molar ratio of TMEDA to the organolithium initiator of greater than about 0.2:1 should not be exceeded because the TMEDA acts as a polymerization modifier and increases the glass transition temperature of the SIBR produced.

To keep the glass transition temperature of the SIBR within the desired range of about $-90°$ C. to about $-70°$ C., the amount of TMEDA employed should be the minimum amount required to inhibit gelation. A molar ratio of TMEDA to the organolithium compound of greater than about 0.2:1 will typically not be exceeded because such high ratios of TMEDA to the organolithium compound can result in the SIBR produced having a glass transition temperature of greater than $-70°$ C. As a general rule, a molar ratio of TMEDA to the organolithium compound which is within the range of about 0.05:1 to about 0.15:1 will be employed. It is typically more preferred for the molar ratio of TMEDA to the organolithium compound to be within the range of about 0.08:1 to about 0.12:1.

After a monomer conversion of about 70% to about 100% is achieved, the living intermediate polymer is partially coupled with divinyl benzene, tin tetrachloride or silicon tetrachloride. This is typically done in a second reaction vessel. For instance, the living intermediate polymer can be pumped from a first reaction vessel to a second reaction vessel where the coupling agent is added to the polymerization medium. The coupling agent is preferably added after a monomer conversion of 72% to 90% has been attained and is more preferably added after a monomer conversion of 75% to 85% has been attained.

The coupling agent is added at a level which is sufficient to jump the molecular weight of the polymer to the desired degree without killing all of the living intermediate polymer chains. In the absence of coupling agents, all of the polymer chains can grow to completion (but no molecular weight jumping can occur). At a molar ratio of organolithium initiator to coupling agent of 4 or greater, complete coupling is possible, but because the coupling is by termination, further polymerization and higher levels of conversion cannot be attained. The optimum level is, of course, between these two extremes. As a general rule, the molar ratio of organolithium compound to the coupling agent will be within the range of about 6:1 to about 20:1. Molar ratios of the organolithium compound to the coupling agent which are within the range of about 8:1 to about 12:1 are preferred because they induce sufficient coupling to achieve the desired increased in molecular weight while leaving an adequate number of living chains to attain acceptable conversion levels. Since there are fewer living chains after the coupling, those that are still living attain a higher molecular weight than would otherwise have been achieved had the coupling agent not been employed.

Since the living intermediate polymer is only partially coupled, living polymer chains still exist after the coupling step. In the third step of the process of this invention, the terpolymerization is allowed to continue with the still living polymer chains increasing in molecular weight as the terpolymerization continues. The terpolymerization is allowed to continue in this step until a conversion in excess of about 95 percent is attained. It is preferred for the conversion to be in excess of about 98 percent with essentially quantitative conversions of greater than about 99 percent preferably being reached.

The SIBR produced is then recovered from the organic solvent. The SIBR can be recovered from the organic solvent by standard techniques, such as decantation, filtration, centrification and the like. It is often desirable to precipitate the SIBR from the organic solvent by the addition of lower alcohols containing from 1 to about 4 carbon atoms to the polymer solution. Suitable lower alcohols for precipitation of the SIBR from the polymer cement include methanol, ethanol, isopropyl alcohol, n-propyl alcohol and t-butyl alcohol. The utilization of lower alcohols to precipitate the SIBR from the polymer cement also "kills" the living SIBR chains by inactivating lithium end groups. After the SIBR is recovered from the organic solvent, steam stripping can be employed to reduce the level of volatile organic compounds in the rubber.

The SIBR made by the process of this invention is characterized by being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene, and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about $-90°$ C. to about $-70°$ C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5. The repeat units in the SIBR will preferably be derived from about 6 weight percent to about 15 weight percent styrene, from about 10 weight percent to about 30 weight percent isoprene, and from about 60 weight percent to about 80 weight percent 1,3-butadiene. The repeat units in the SIBR will most preferably be comprised of repeat units which are derived from about 8 weight percent to about 12 weight percent styrene, from about 15 weight percent to about 25 weight percent isoprene, and from about 65 weight percent to about 75 weight percent 1,3-butadiene. These repeat units which are derived from isoprene, styrene or 1,3-butadiene differ from the monomer from which they were derived in that a double bond was consumed by the polymerization reaction.

The repeat units derived from styrene, isoprene and 1,3-butadiene are in the SIBR in an essentially random order. The term "random" as used herein means that the repeat units which are derived from styrene are well dispersed throughout the polymer and are mixed in with repeat units which are derived from isoprene and 1,3-butadiene. It has been determined that over 70% of the styrene in the SIBR is present in blocks of only one styrene repeat unit. Over 90% of the repeat units in the SIBR which are derived from styrene are in blocks of one or two repeat units. Over 95% of the styrene in the SIBR is present in blocks of three or less repeat units. Over 97% of the styrene present in the SIBR is present in blocks of four or less repeat units. Over 99% of the styrene present in the SIBR is present in blocks of five or less repeat units. Virtually 100% of the styrene present in the SIBR is in blocks of six or less repeat units.

Preferably, from about 30% to about 35% of the repeat units derived from the 1,3-butadiene are of the cis-microstructure. Preferably, from about 45% to about 55% of the repeat units derived from the 1,3-butadiene are of the trans-microstructure. Preferably, from about 15% to about 20% of the repeat units derived from the 1,3-butadiene are of the vinyl-microstructure. Preferably, from about 80% to about 85% of the repeat units derived from the isoprene are of the 1,4-microstructure. Preferably, from about 15% to about 20% of the repeat units derived from the isoprene are of the 3,4-microstructure. It is preferred for the SIBR to have a glass transition temperature which is within the range of about $-85°$ C. to about $-75°$ C.

The SIBR will preferably have a number average molecular weight which is within the range of about 250,000 to about 300,000. It is preferred for the SIBR to have a weight average molecular weight which is within the range of about 500,000 to about 600,000. It is preferred for the SIBR to have an inhomogeneity (u) which is within the range of about 0.8 to 1.2. Inhomogeneity is defined by the equation:

$$u = \frac{\text{weight average molecular weight}}{\text{number average molecular weight}} - 1$$

In other words, the ratio of the weight average molecular weight of the SIBR to its number average molecular weight is preferably 2:1.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

The SIBR of this invention is particularly valuable for use in making truck tires which display less rolling resistance and are, accordingly, more energy efficient. The SIBR is blended with natural rubbers and, optionally, high cis 1,4-polybutadiene in making tread compounds. One such tread compound is comprised of, based on 100 parts by weight of rubber, (a) from about 45 parts to about 75 parts of the SIBR and (b) from about 25 parts to about 55 parts of natural rubber. It is preferred for this tread compound to contain from about 55 parts to about 65 parts of the SIBR and from about 35 parts to about 45 parts of natural rubber. Another highly preferred blend for utilization in making truck tires is comprised of, based on 100 parts by weight of rubber, (a) 50 parts to 70 parts of the SIBR, (b) from about 15 parts to about 45 parts of natural rubber, and (c) from about 2 parts to about 20 parts of high cis 1,4-polybutadiene. It is preferred for this rubber blend to contain from about 55 parts to about 65 parts of the SIBR, from about 5 parts to about 15 parts of the high cis 1,4-polybutadiene, and from about 25 parts to about 40 parts of natural rubber. The high cis 1,4-polybutadiene utilized in such blends typically has a microstructure wherein at least 80% of the butadiene repeat units are cis 1,4-isomeric units. In most cases, the high cis 1,4-polybutadiene will contain at least about 90% cis 1,4-isomeric butadiene units. The high cis 1,4-polybutadiene can be prepared by solution polymerization utilizing a catalyst consisting of (1) an organoaluminum compound, (2) an organonickel compound, and (3) a hydrogen fluoride complex as described in U.S. Pat. No. 3,856,764.

These SIBR containing blends can be compounded utilizing conventional ingredients and standard techniques. For instance, the SIBR containing blends will typically be blended with carbon black, sulfur, fillers, accelerators, oils, waxes, scorch inhibiting agents, and processing aids. In most cases, the SIBR containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The SIBR containing blends of this invention will also normally contain from 0.5 to 10 phr of zinc oxide with 1 to 5 phr being preferred. These blends can optionally contain from 0 to 10 phr of a tackifier resins, 0 to 10 phr of reinforcing resins, 1 to 10 phr of fatty acids, 0 to 2.5 phr of peptizers, and 0 to 1 phr of scorch inhibiting agents.

The SIBR containing rubber blends of this invention can be used in tire treads in conjunction with ordinary tire manufacturing techniques. Tires are built utilizing standard procedures with the SIBR simply being substituted for the rubber compounds typically used as the tread rubber. After the tire has been built with the SIBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

The SIBR prepared in this experiment was synthesized in a two-reactor (10 liters each) continuous system at 95° C. A premix containing styrene, isoprene and 1,3-butadiene in hexane was charged into the first polymerization reactor continuously at a rate of 65.6 grams/minute. The premix monomer solution containing a ratio of styrene to isoprene to 1,3-butadiene of 10:30:60 and had a total monomer concentration of 14%. Polymerization was initiated by adding a 0.128M solution of n-butyllithium into the first reactor at a rate of 0.4 grams/minute. The resulting polymerization medium containing the live ends was continuously pushed in to the second reactor where the coupling agent, silicon tetrachloride, (0.025M solution in hexane) was added at a rate of 0.34 grams/minute. The residence time for both reactors was set at two hours to achieve complete monomer conversion in the first reactor and complete coupling in the second reactor. The polymerization medium was then continuously pushed over to a holding tank containing the shortstop (methanol) and an antioxidant. The resulting polymer cement was then steam stripped and the recovered SIBR was dried in a vacuum oven at 60° C. The styrene distribution in the SIBR was random since the styrene, isoprene and butadiene monomers were continuously pumped into the reactors. The polymer was determined to have a glass transition temperature at −80° C. and have a Mooney ML-4 viscosity of 85. It was also determined to have a microstructure which contained 10% styrene units, 20% cis 1,4-polybutadiene units, 30% trans 1,4-polybutadiene units, 10% 1,2-polybutadiene units, 25% 1,4-polyisoprene units and 5% 3,4-polyisoprene units.

The recovered SIBR terpolymer and a control polymer which is a commercial emulsion SBR containing 23.5% styrene and 76.5% butadiene were then compounded utilizing a truck tire tread formulation which included carbon black, sulfur, natural rubber and an accelerator. The natural rubber was included in the blend at a 1:1 ratio to the SIBR or the control SBR. Their compound physical properties and tire performance properties are listed in Tables I and II, respectively.

TABLE I

| | Compound Physical Properties | |
|---|---|---|
| Compound | SBR Blend | SIBR Blend |
| Tensile Strength (MPa) | 18.0 | 20.0 |
| Elongation (%) | 475 | 450 |
| Mooney (ML 1 + 4) | 55 | 65 |
| Rebound (%) @ 0° C. | 35 | 35 |
| Rebound @ 100° C. | 60 | 66 |
| Rheology Properties | | |
| Tan Delta @ 0° C. | 0.236 | 0.167 |
| Tan Delta @ 60° C. | 0.205 | 0.158 |

TABLE II

| | Tire Performance Properties | |
|---|---|---|
| Tire Compound (TABLE I) | SBR Blend | SIBR Blend |
| Measured Values | | |
| Evenness of Wear[1] | 100 | 112 |
| Rolling Resistance[2] (67" Wheel) | 100 | 110 |
| Wet Skid Resistance | 100 | 97 |
| Wet Traction | 100 | 100 |
| Heat Rise[3] (67" Wheel) | 100 | 105 |
| Tread Wear-Highway[4] | 100 | 115 |

[1] Evenness (uniformity) of wear is the standard deviation of tread depth measurements expressed as a rating. An increase in the rating is an improvement.
[2] An increase in the rolling resistance value quoted is a measure of the reduction of rolling resistance of the tire and thus an improvement.
[3] An increase in the heat rise rating value is an improvement.
[4] An increase in the tread wear rating value is an improvement.

EXAMPLE 2

A 15-gallon first reactor was connected in series to a 27-gallon second reactor. The premix, n-butyllithium (NBuLi) catalyst, and TMEDA modifier (when used) were charged to the first reactor. The tin tetrachloride (SiCl$_4$) coupling agent was added to the second reactor. The cement leaving the second reactor was treated with a shortstop and an antioxidant in separate in-line continuous mixers. Because the early trials required that no modifier be used, premix was held to 15% monomer concentration to avoid high cement viscosity.

SiCl$_4$ was added at a level sufficient to achieve the desired molecular weight increase but also at a level low enough to allow the reaction to continue in the second reactor. Clearly, in the absence of SiCl$_4$, no coupling can occur; but all chains can grow to completion in the second reactor. At a nBuLi/SiCl$_4$ mole ratio of 4, complete coupling is possible (SiCl$_4$ is tetrafunctional); but because SiCl$_4$ couples by termination, little additional conversion occurs. The optimum level, then, must lie between these two extremes. A nBuLi/SiCl$_4$ mole ratio of about 8 to 12 will induce sufficient coupling to achieve the desired increase in molecular weight while leaving adequate active chains to attain acceptable conversion.

It must also be noted that the increase in molecular weight in the second reactor is a result not only of the coupling reaction but is also a consequence of the chain termination caused by the SiCl$_4$ - at a nBuLi/SiCl$_4$ of 8, half of the chains will be terminated by coupling, while the other half continue to grow. The net effect is a 50% reduction in catalyst level in the second reactor, which leads to a higher molecular weight increase in the uncoupled chains than would otherwise be achieved. Of course, this description is simplified. Because this is a continuous system, any given chain may be coupled at any time. Therefore, the "arms" of the stars are not uniform in molecular weight but are chosen from a broad distribution of molecular weights. In addition, the first reactor conversion is a factor influencing polymer arrangement: should the first reactor be operated at full conversion, then coupling and only coupling occurs in the second. Increasing the monomer available to the second reactor by reducing first reactor conversion allows both polymerization and coupling to occur in the second reactor. During this study, the first reactor temperature was lowered from the usual 175°-185° C. (79°-85° C.) to 150° F. (66° C.), primarily to allow sufficient butadiene to be available to the growing chains to promote efficient coupling. (Chains ending in polybutadiene segments couple easily; those ending in polystyrene couple poorly).

For the first trial, 1,2-butadiene was added to the premix at 10 ppm (based on monomer), the amount of this gel inhibitor typical for most modified processes. About 60–70% of the monomer was converted in the first reactor, and about 90–95% conversion was attained overall.

After only a few days of operation, the first reactor internal temperature began to cycle, usually an indication of reactor fouling. After 16 days of increasingly erratic operation, the unit was shut down and the reactors opened for inspection. The first reactor was almost completely filled with gel; only a small tunnel around the agitator shaft remained clear. The 1,2-butadiene level was increased incrementally to 500 ppm (see Table III) without a satisfactory reduction in gel formation. It should be noted that 500 ppm of 1,2 -butadiene is an extremely high level. Interestingly, most modified lithium polymers require only 100–150 ppm of 1,2-butadiene to operate nearly gel-free.

TMEDA modifier was put on stream and adjusted to give a polymer Tg of −75° C. versus the −80° C. of the unmodified polymer. A TMEDA/nBuLi mole ratio of about 0.10 was sufficient to raise the Tg by this amount. 1,2-butadiene was used at 150 ppm based on monomer. The unit reached steady-state and was allowed to run for 21 days (during which time samples were taken and a quantity of polymer collected before it was shut down for inspection). Only a thin skin of polymer, about ⅛" thick was found clinging to the walls.

NMR analyses of both the unmodified and modified polymers showed the microstructures to be similar, except for slightly higher 1,2-polybutadiene content of the modified polymer (which is to be expected) and a slightly lower styrene content in the modified polymer. Styrene content, however, may be easily controlled through monomer charge compensation or process adjustments.

To ensure polymer uniformity throughout the finished product, the cement was blended in two 4800-gallon (18,170 liter) lots, each providing about 3000 lbs. of finished product. A 5700-gallon (21,577 liter) blend tank was used to make each blend. The cement was steam stripped and finished in the usual manner. The first blend yielded 3150 lbs. (1429 kg) of product. The second lot yielded 3310 lbs. (1501 kg) of rubber. The physical properties of these lots are listed in Table IV.

TABLE III

| | Effect of Reaction Conditions on Length of Operation | | |
|---|---|---|---|
| TMEDA | 1,2-butadiene ppm | Days of Operation | Degree of Fouling |
| No | 100 | 16 | Complete |
| No | 150 | 7 | Severe |

TABLE III-continued
Effect of Reaction Conditions on Length of Operation

| TMEDA | 1,2-butadiene ppm | Days of Operation | Degree of Fouling |
|---|---|---|---|
| No | 250 | 9 | Severe |
| No | 350 | 17 | Severe |
| No | 500 | 4 | High |
| Yes | 150 | 21 | Little |

TABLE IV
Physical Properties of Polymer Produced

| | First Lot | Second Lot |
|---|---|---|
| Final Mooney ML-4 | 77–80 | 80–83 |
| Base Mooney ML-4 | 30 | 30 |
| DSV | 2.75 | 2.75 |
| DSV gel, % | 1.80 | 0.50 |
| Tg, °C. | −79 | −78 |
| Volatiles, % | 0.46 | 0.15 |
| Ash, % | 0 | 0 |
| Cold Flow, mg/min | 0 | 0 |
| Disposition | 3310 lbs. | 3150 lbs. |

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a styrene-isoprene-butadiene rubber which is particularly valuable for use in making truck tire treads which comprises the steps of (1) continuously solution terpolymerizing in an organic solvent from about 5 weight percent to about 20 weight percent styrene, from about 7 weight percent to about 35 weight percent isoprene, and from about 55 weight percent to about 88 weight percent 1,3-butadiene, based on total monomers, to a conversion which is in the range of about 60% to about 100% to produce a living intermediate polymer, wherein the terpolymerization is initiated with an organolithium compound, wherein the terpolymerization is conducted in the presence of 10 ppm to 500 ppm of 1,2-butadiene, and wherein the terpolymerization is conducted in the presence of N,N,N',N'-tetramethylethylenediamine at a molar ratio of N,N,N',N'-tetramethylethylenediamine to the organolithium compound which is within the range of about 0.01:1 to about 0.2:1, and wherein the terpolymerization is conducted at a temperature which is within the range of about 75° C. to about 150° C.; (2) partially coupling the living intermediate polymer with a coupling agent selected from the group consisting of divinyl benzene, tin tetrachloride and silicon tetrachloride, wherein the molar ratio of the organolithium compound to the coupling agent is within the range of about 6:1 to about 20:1; (3) allowing the terpolymerization to continue so as to produce the styrene-isoprene-butadiene rubber; and recovering the styrene-isoprene-butadiene rubber from the organic solvent.

2. A process as specified in claim 1 wherein step (1) is carried out in a first reactor and wherein step (2) is carried out in a second reactor.

3. A process as specified in claim 2 wherein the 1,2-butadiene is present at a level which is within the range of about ppm to about 300 ppm.

4. A process as specified in claim 3 wherein the molar ratio of N,N,N',N'-tetramethylethylenediamine to organolithium initiator is within the range of about 0.05:1 to about 0.15:1.

5. A process as specified in claim 4 wherein the molar ratio of the organolithium initiator to the coupling agent is within the range of about 8:1 to about 12:1.

6. A process as specified in claim 5 wherein the 1,2-butadiene is present at a level which is within the range of about 100 ppm to about 200 ppm.

7. A process as specified in claim 2 wherein the organolithium compound is an organomonolithium compound.

8. A process as specified in claim 4 wherein the living intermediate polymer is partially coupled after a monomer conversion of 72% to 90% has been attained.

9. A process as specified in claim 5 wherein the coupling agent is selected from the group consisting of tin tetrachloride and silicon tetrachloride.

* * * * *